United States Patent
Kulkarni

[11] Patent Number: 5,941,986
[45] Date of Patent: Aug. 24, 1999

[54] MICRO-CODE SEQUENCER WITH BRANCH-TAKEN AND BRANCH-NOT-TAKEN MICRO-CODE VECTORS SHARING COMMON ADDRESS TO ELIMINATE TAKEN BRANCH PENALTIES

[75] Inventor: Upendra M. Kulkarni, Sacramento, Calif.

[73] Assignee: Intel Corporation, Santa Clara, Calif.

[21] Appl. No.: 08/055,971

[22] Filed: Apr. 30, 1993

[51] Int. Cl.[6] ........................................................ G06F 9/22
[52] U.S. Cl. .......................................... 712/245; 712/234
[58] Field of Search ................................ 712/220, 1, 211, 712/230, 231, 233, 234, 244, 245, 246, 247, 248; 711/100

[56] References Cited

U.S. PATENT DOCUMENTS

| | | | |
|---|---|---|---|
| 4,087,857 | 5/1978 | Joyce et al. | 395/572 |
| 4,118,773 | 10/1978 | Raguin et al. | 711/215 |
| 4,125,877 | 11/1978 | Reinert | 365/190 |
| 4,295,193 | 10/1981 | Pomerene | 395/375 |
| 4,360,869 | 11/1982 | Stanley et al. | 395/381 |
| 4,446,518 | 5/1984 | Casamatta | 395/425 |
| 4,521,858 | 6/1985 | Kraemer et al. | 711/215 |
| 4,587,611 | 5/1986 | Amdahl et al. | 395/375 |
| 4,812,970 | 3/1989 | Kitamura et al. | 395/375 |
| 4,812,972 | 3/1989 | Chastain et al. | 395/387 |
| 5,058,007 | 10/1991 | Feil | 395/375 |
| 5,124,910 | 6/1992 | Koumoto et al. | 395/375 |
| 5,148,532 | 9/1992 | Narita et al. | 395/375 |
| 5,241,637 | 8/1993 | Skruhak et al. | 395/388 |
| 5,297,281 | 3/1994 | Emma et al. | 395/392 |
| 5,377,335 | 12/1994 | Keller et al. | 395/395 |

*Primary Examiner*—Viet D. Vu
*Attorney, Agent, or Firm*—Blakely, Sokoloff, Taylor & Zafman

[57] ABSTRACT

The dual-ported micro-code sequencer includes a micro-code ROM which provides micro-code vectors to a latch for access by a data path logic unit. The latch allows for pipe-lining whereby one micro-code vector may be fetched while a second micro-code vector is being executed by the data path logic unit. Micro-code vectors provided by the ROM may include branched vectors controlled by branch conditions. Two output ports are provide to the micro-code ROM for simultaneously outputting both branch-taken vectors and branch-not-taken vectors to a multiplexer connected to the input of the latch. The multiplexer and the two output ports are provided such that both the branch-taken and the branch-not-taken vectors are available to the latch input. Thus, once the branch condition is evaluated the correct branched vector is latched for access by the data path logic. The dual-ported architecture substantially eliminates a problem in pipelined micro-code sequencers wherein a clock cycle is wasted if a branch is taken. The micro-code ROM is written such that the branch-taken and branch-not-taken vectors share a common micro-code address.

23 Claims, 8 Drawing Sheets

MICRO-CODE SEQUENCER WITH BRANCH-TAKEN AND BRANCH-NOT-TAKEN MICRO-CODE VECTORS SHARING COMMON ADDRESS TO ELIMINATE TAKEN BRANCH PENALTIES

BACKGROUND OF THE INVENTION

1. Field of the Invention

The invention generally relates to microprocessors and, in particular, relates to a micro-code sequencer for use in a microprocessor.

2. Description of Related Art

Many complex instruction set computers (CISC) employ micro-code for facilitating the implementation of complex instruction sets. In a computer or microprocessor employing micro-code, most instructions are encoded within a micro-code ROM wherein each of the instructions is represented by a sequence of micro-vectors, each micro-vector having a unique address within the micro-code ROM. Typically, each instruction is represented by four to six micro-vectors, although longer micro-vector sequences are sometimes employed to represent highly complex instructions. In use, the micro-vectors for a corresponding instruction are fetched from the micro-code ROM, then executed by a data path logic unit. Hence, for each micro-vector, two steps are required—a fetch step and an execution step. With a single instruction requiring several micro-vectors and with each micro-vector requiring two clock cycles for fetch and execution, quite a number of clock cycles may be required to execute a single instruction. To improve overall throughput, the fetching and execution of micro-vectors is pipelined, whereby one micro-vector is executed while a second micro-vector is fetched. To this end, a latch is connected between the micro-code ROM and the data path logic unit to allow execution of one micro-vector, while a subsequent micro-vector is fetched, thereby achieving two-stage pipe-lining.

The pipelined execution of micro-code is controlled by a micro-code sequencer, a conventional example of which is illustrated in FIG. 1. Conventional micro-code sequencer 10 includes a micro-code ROM 12 for storing individual micro-code vectors, each having a unique micro-address. During use, individual micro-code vectors are output from ROM 12 along a path 13 to a latch 14, then output to a data path logic unit 16 along a path 15. Data path logic unit 15 executes the micro-code vectors received from latch 14. Output, latching, and execution of the micro-code vectors are synchronized by a clock signal provided on a clock line 18.

The micro-code vectors to be output from ROM 12 at each clock cycle are identified by a micro-instruction pointer 20. The micro-code vectors corresponding to a single instruction are stored in sequence in ROM 12 with each vector having a micro-address incrementally higher than the last. With such a configuration, a sequence of micro-vectors for a single instruction are identified merely by incrementing a starting micro-address with each clock cycle. The starting micro-address is supplied to micro-instruction pointer 20 along a line 21 from an instruction decoder (not shown) via a multiplexer (MUX) 24 connected to an input of micro-instruction pointer 20. An adder 20 is also connected to micro-instruction pointer 20 through MUX 24 for incrementing the micro-address stored within micro-instruction pointer 20 on each clock cycle, after the starting address has been received and processed.

However, many instructions include branch micro-vectors which define branch conditions. Depending on the result of the branch condition, the micro-code vectors to be fetched and executed may not have sequential micro-code addresses. To facilitate processing of branch conditions, multiplexer MUX 24 additionally receives a branch condition and a branch target address along lines 26 and 28. The branch condition and the branch target address are both specified within the branch micro-vector. The branch condition specifies certain flags, registers, or flip-flops (not shown) within data path logic unit 16 that are examined for branch resolution. The branch target address specifies the micro-address of the micro-vector that is to be fetched and executed if the branch is taken. The branch target address is received directly from an output of latch 14. The branch condition is also output from latch 14, but is processed by a branch resolver 29 prior to transmission to micro-instruction MUX 24. Branch resolver 29 also receives branch status flags directly from data path logic unit 16. If a branch is taken, as indicated by a branch signal received along line 31, multiplexer 24 transmits a branch target address received along line 28 to micro-instruction pointer 20. If no branch is taken, MUX 24 merely transmits the incremented micro-code address received from adder 22 to micro-instruction pointer 20.

Hence, upon each clock cycle, micro-instruction pointer 20 receives a micro-code address which is either a new starting address, a next sequentially incremented address or a branch target address. The micro-address is then transmitted to micro-code ROM 12 along lines 32. Micro-code ROM 12 responds by outputting, along path 13, the micro-vector corresponding to the received micro-code address. As noted above, the vector is latched by latch 14 and executed by data path logic 16. Execution proceeds until all vectors corresponding to the instruction are executed. Then, a new instruction is received along line 21 and the vectors for the new instruction are fetched and executed accordingly. With some implementations of micro-code, a branch condition defines a branch-taken stream of micro-vectors and a branch-not-taken stream of micro-vectors, with each stream comprised of two or more micro-vectors. The branch address received by MUX 24 along line 28 defines only the first address of the branch-taken stream. However, in many implementations of micro-code, each branch-not-taken vector stream includes only one micro-vector and the corresponding branch-taken-vector immediately follows the single branch-not-taken vector, i.e. each stream has a length of one micro-vector. In such an implementation, a branch target address need not be transmitted to MUX 24 from latch 14. Rather, the branch target address is always the next sequential address following the branch-not-taken vector, and that next sequential address is merely supplied by adder 22. In either case, the vector immediately following the branch must be squashed if the branch is taken.

As noted above, latch 14 is provided to achieve two-stage pipe-lining for enhancing the efficiency of the micro-code sequencer. The pipe-lining is illustrated in FIG. 2 which provides timing diagrams for the conventional micro-code sequencer of FIG. 1. In FIG. 2, sequence 40 illustrates five cycles of a clock signal. Sequence 42 illustrates micro-addresses N, N+1, N+2, and N+3. Sequence 44 illustrates micro-vectors A, B, C, and D corresponding to the micro-addresses 42. More precisely, sequence 44 illustrates the micro-vectors output from the micro-code ROM in response to micro-addresses 42. As can be seen, a new vector is latched at each clock cycle. Execution of the vectors is illustrated by sequence 46. Each vector is executed during a clock cycle immediately subsequent to the clock cycle when the vector was latched. Thus, during most clock cycles, one vector is latched while a second vector is executed.

Without branch conditions, the pipe-lining illustrated in FIG. 2 would achieve a high overall throughput, thereby lowering overall micro-instruction throughput. However, branch conditions can cause clock cycles to be wasted. In the example of FIG. 2, clock cycle 4 is wasted. Micro-vector B represents a branch condition which causes either vector C or vector D to be executed next, depending upon the resolution of the branch condition. However, vector C is automatically latched while the branch condition is being evaluated. Hence, if the branch condition indicates that vector D is to be executed next, then vector C must be squashed (as shown). Vector D must then be fetched and latched before execution can continue, resulting in the loss of one clock cycle.

Thus, FIGS. 1 and 2 illustrate a problem occurring within conventional micro-code sequencers wherein a clock cycle may be wasted upon the execution of the branch condition within the micro-code. Heretofore, no adequate solution has been proposed for remedying this problem.

SUMMARY OF THE INVENTION

From the foregoing it can be appreciated that there is a need to provide a new micro-code sequencer in which fewer clock cycles are wasted upon the execution of branch conditions, thereby achieving a higher overall throughput of micro-code instructions. It is one of the general objects of the invention to provide an improved micro-code sequencer to enhance the overall throughput of micro-code instructions within the sequencer.

This object, and other general objects of the invention, is achieved by a computer system having a dual-ported micro-code sequencer within a microprocessor chip. The dual-ported micro-code sequencer includes a micro-code means for providing sequences of micro-code vectors with the micro-code means having two ports for outputting both a branch-taken and a branch-not-taken micro-code vectors in parallel, such that a data path logic unit processing the micro-code vectors has immediate access to the appropriate micro-code vector regardless whether the branch is taken or not taken.

In a preferred embodiment, the micro-code means of the invention provides sequences of micro-code vectors, with the sequences including branch-taken vectors and branch-not-taken vectors. The branch-taken vectors and the branch-not-taken vectors share a common address. The branch-taken vectors are output from the micro-mode means along a first output port and the branch-not-taken vectors are output along a second output port. A multiplexer means is connected to the first and second output ports for transmitting a selected one of the vectors to a latch. The multiplexer means transmits the branch-taken vector if the branch is taken and transmits the branch-not-taken vector otherwise. Data path logic means are provided for receiving and processing vectors from the latch and for evaluating branch conditions. As a result of this implementation, the data path logic means properly receives either the branch-taken vector or the branch-not-taken vector, one clock cycle after evaluation of the branch condition, without a clock cycle being wasted.

In one particular embodiment, the micro-code means is implemented as a micro-code ROM which stores individual micro-code vectors defining a set of micro-instructions. A micro-instruction pointer maintains the micro-address of a current vector. An adder, connected to the micro-instruction pointer, increments the current micro-code address. An input of the micro-instruction pointer is connected to an output of a latch-input multiplexer which receives an incremented address from the adder and receives a branch target address from the latch. Depending upon the evaluation of a branch condition by the data path logic means, the latch-input multiplexer transmits either the incremented address, received from the adder, or the branch target address, received from the latch, to the micro-instruction pointer which, in turn, transmits the appropriate micro-code address to the micro-code ROM. At each branch condition, the micro-code ROM transmits both the branch-taken and the branch-not-taken vectors to the latch-input multiplexer. The latch-input multiplexer also receives a branch condition signal from a branch register connected to the latch and to the data path logic means. The branch condition signal steers the multiplexer to provide either the branch-taken or the branch-not-taken vector to the latch.

Preferably, the micro-code sequencer uses a micro-code implementation wherein the branch-taken vector always follows immediately after the branch-not-taken vector within the micro-code ROM. In such an implementation, the micro-code length of either the branch-taken or the branch-not-taken vectors is never more than one. However, in an alternative embodiment, the branch-taken micro-vector is the first vector of a stream of vectors, having two or more individual vectors with sequential addresses. The stream of vectors are executed in sequence if the branch is taken. The branch-not-taken micro-vector defines a second stream of vectors, also including two or more individual vectors having sequential addresses, executed in sequence if the branch is not taken. The micro-code is structured so that the initial vectors of the first and second streams share a common micro-address within the micro-code ROM. The second vectors of each stream also share a common micro-code address. In this manner, each vector of the first stream shares a micro-code address with a corresponding vector in the second stream. Thus, the branch condition determines which of a pair of streams of micro-vectors is to be transmitted by the latch-input multiplexer and executed by the data path logic means. In this alternative embodiment, wherein a branch condition can cause a jump over a stream of branch-not-taken vectors, the micro-code is preferably structured to include a direction bit within the least significant bit of the vector. The direction bit indicates whether the next micro-vector is to be output from the first or the second port of the dual-ported micro-code ROM.

In its various embodiments, the invention substantially eliminates the necessity to squash a micro-code vector upon the execution of a branch-not-taken vector within the micro-code. Minimal hardware modifications are required to achieve the advantages of the invention. Further, no substantial execution-time overhead is required. With the invention, a micro-code sequencer is capable of achieving a higher overall throughput.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

A micro-code sequencer having a dual-ported architecture is disclosed. In the following detailed specification, to provide a thorough understanding of the present invention, numerous specific details are set forth, such as the configuration of a particular micro-code sequencer. It will, however, be apparent to one skilled in the art that the present invention may be practiced without the specific details described herein. In other instances, well known micro-computer architecture components and well known computer processing steps have not been described in detail to avoid obscuring the principles of the present invention. Throughout the disclosure, micro-code micro-vectors are described and discussed. For brevity, micro-code micro-vectors are often merely referred to as vectors.

Figure 3:
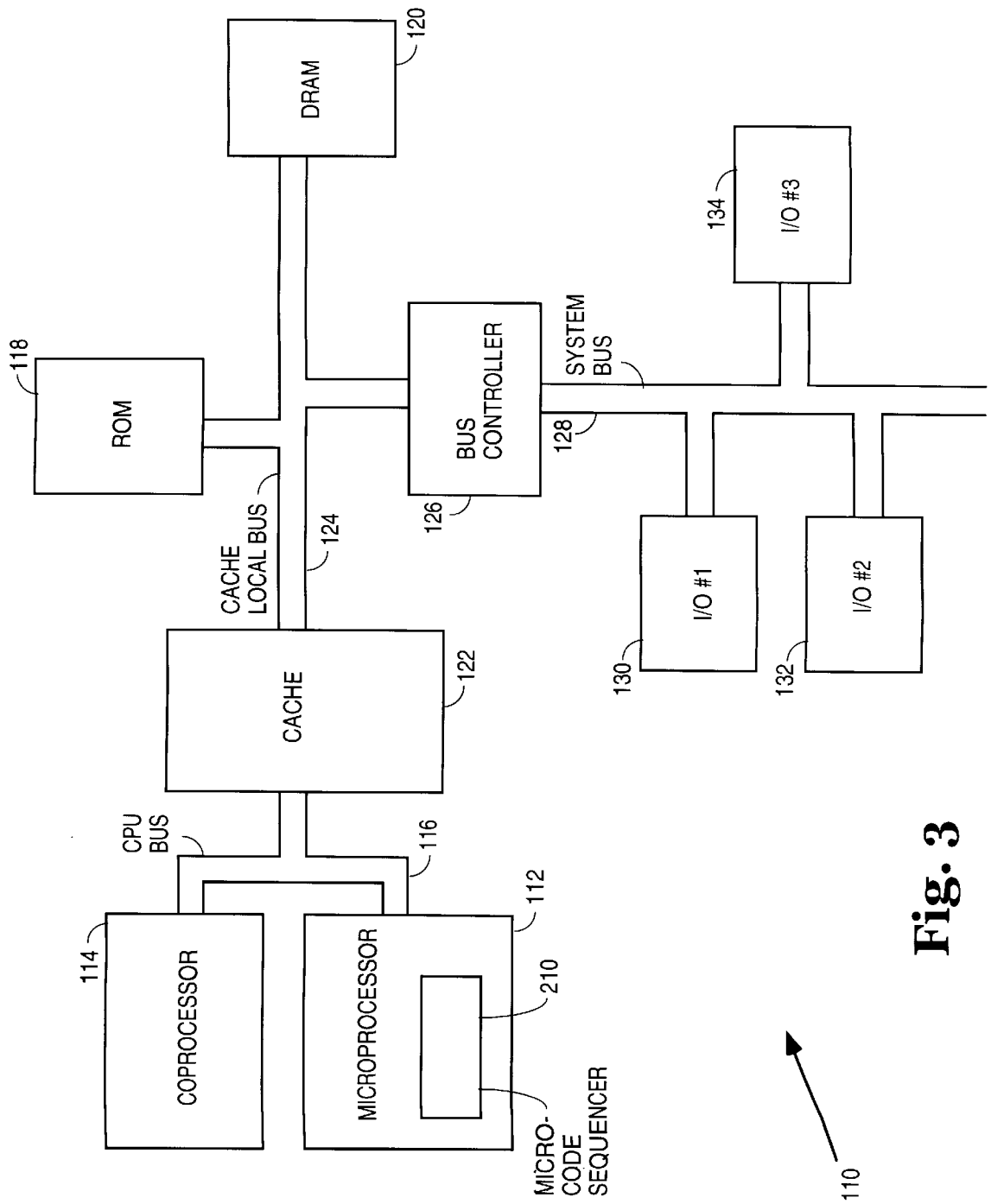
FIG. 3 is a block diagram illustrating a computer system configured in accordance with a preferred embodiment of the invention.

Referring now to FIGS. 3–8, the various preferred embodiments of the invention will now be described. FIG. 3 illustrates a computer system having a microprocessor chip incorporating the micro-code sequencer of the invention.

Computer system 110 includes a micro-processor 112 and a coprocessor 114 connected by a CPU BUS 116. System 110 also includes a read only memory device (ROM) 118 and a DRAM 120. Microprocessor 112 and coprocessor 114 access data stored in ROM 118 and DRAM 120. To facilitate access a memory cache 122 is connected to CPU BUS 116. Cache 122 stores portions of memory retrieved from ROM 118 and DRAM 120 to facilitate high speed access to the data. A cache local BUS 124 connects cache 122, ROM 118 and DRAM 120. Cache local BUS 124 is also connected to a BUS controller 126 which is, in turn connected a system BUS 128. A plurality of input/output devices are connected to system BUS 128. Exemplary I/O devices 130,132 and 134 are illustrated.

In general microprocessor 112 processes predefined instructions to access data stored in ROM 118 and DRAM 120 and to control the operation of input/output devices connected to system BUS 128. As will be described in more detail below, most instructions executed by microprocessor 112 are implemented in micro-code controlled by a micro-code sequencer 210, shown, schematically, in FIG. 3 as a component of microprocessor 112.

Figure 4:
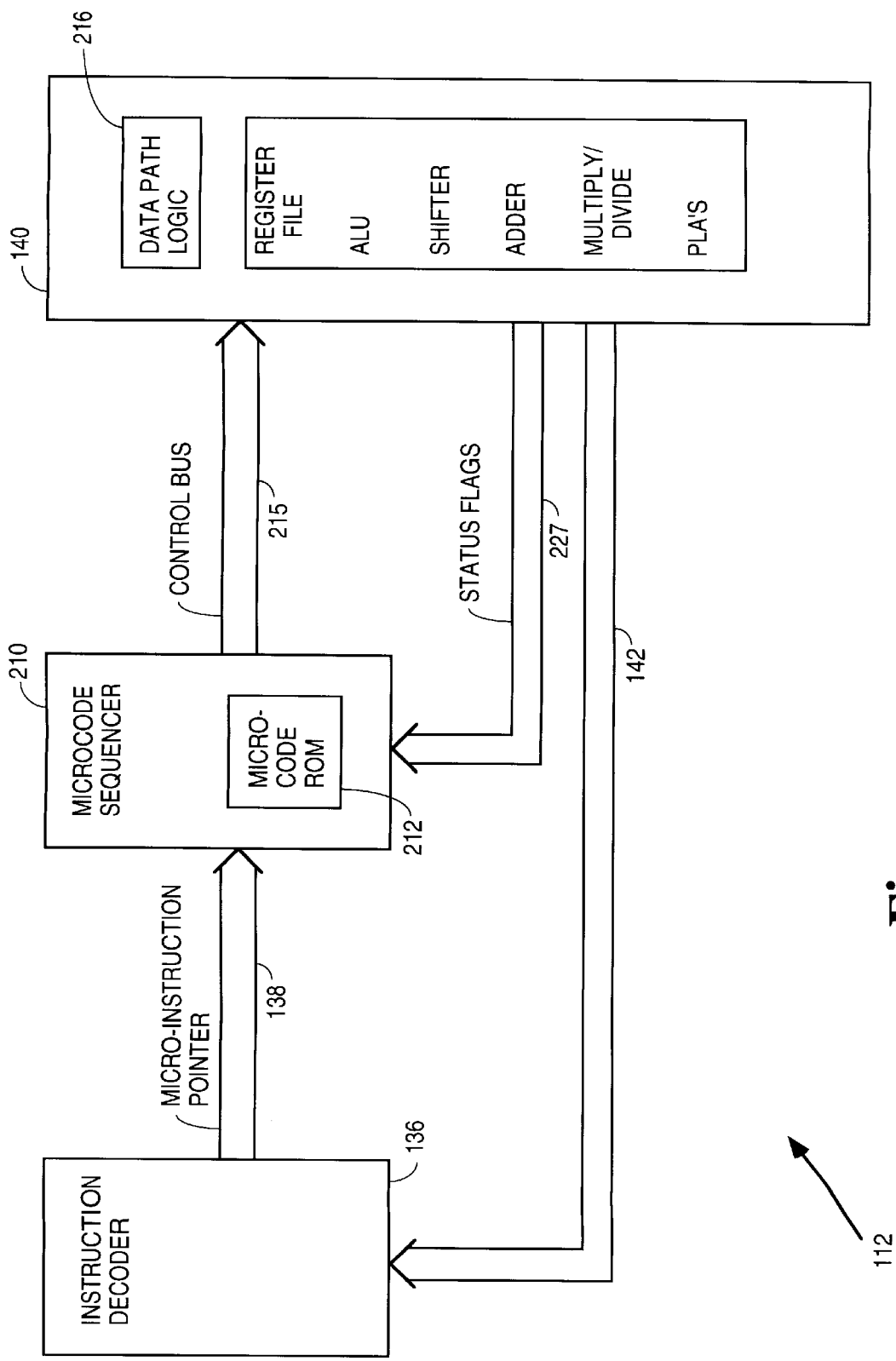
FIG. 4 is an illustration of the micro-architecture of a microprocessor chip of the computer system of FIG. 3.

FIG. 4 illustrates a portion of the micro-architecture of microprocessor 112 of FIG. 3. In FIG. 4, only some of the chip components of microprocessor 112 are shown. Numerous other chip components are not illustrated.

Microprocessor 112 includes an instruction decoder 136 which transmits micro-instruction pointers along a BUS line 138 to micro-code sequencer 210 as illustrated in FIG. 4, a component of micro-code sequencer 210 is a micro-code ROM 212. As will be discussed in more detail below, micro-code sequencer 210 operates to retrieve and process micro-code vectors from ROM 212 and transmit them to a data path logic unit for execution. The data path logic unit and several other chip components are collectively represented by block 140. Output from micro-code sequencer 210 is provided to the data path logic unit and the other on-chip components via a control BUS 215. Status flags including branch status flags are provided to micro-code sequencer 210 along a BUS 227. Instruction decoder 136 is additionally in direct communication with the various chip components of block 140 via a BUS 142.

Figure 1:
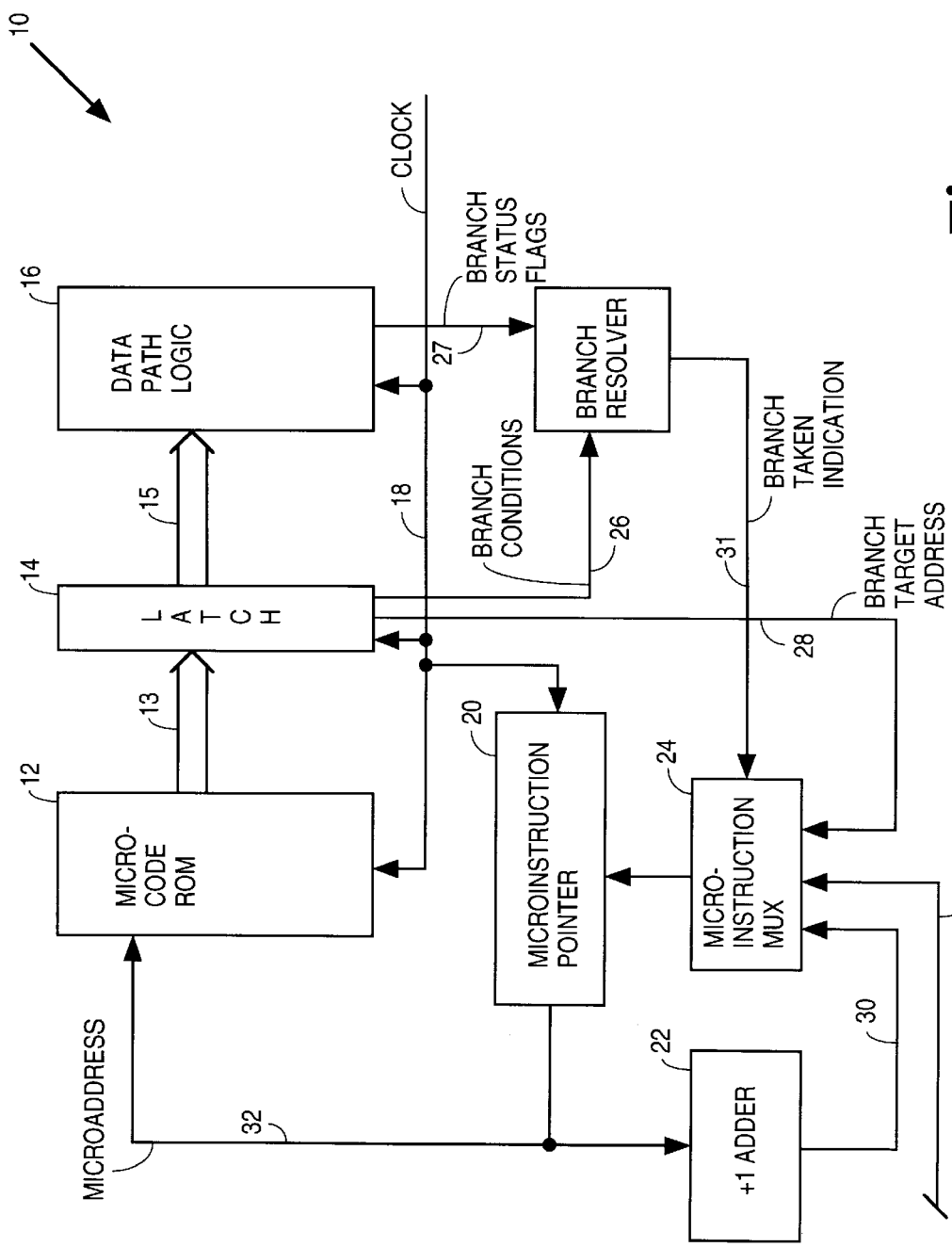
FIG. 1 is a block diagram illustrating a prior art micro-code sequencer.
Figure 5:
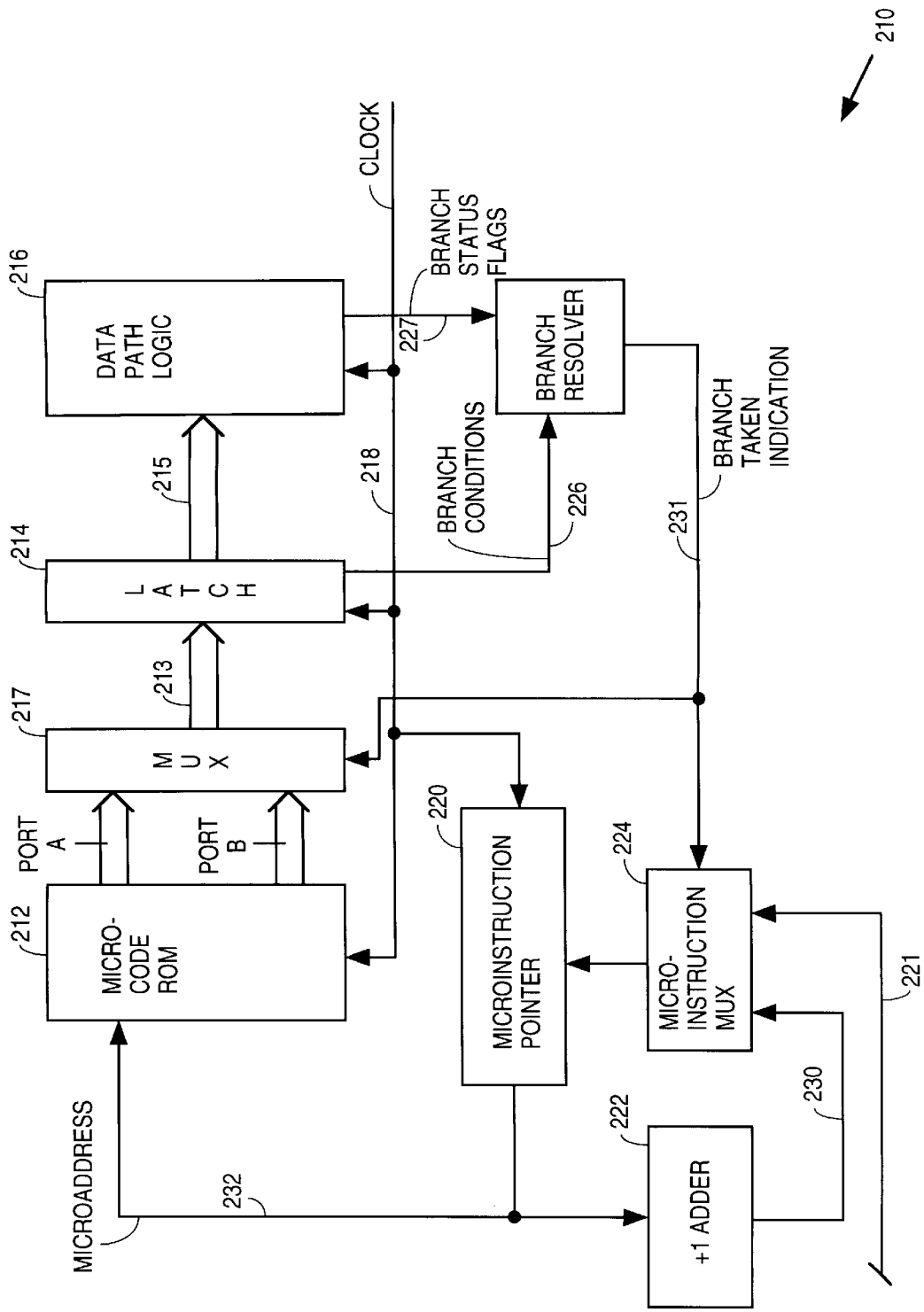
FIG. 5 is a block diagram of a micro-code sequencer of the microprocessor chip of FIG. 4.

Referring to FIG. 5, the architecture of micro-code sequencer 210 of FIG. 4 will now be described. Micro-code sequencer 210 includes a micro-code ROM 212, a latch 214, and a data path logic unit 216. Unlike the prior art micro-code sequencer of FIG. 1, the latch of the micro-code sequencer of FIG. 5 is not directly connected to an output port of micro-code ROM 212. Rather, a latch-input multiplexer 217 is connected between micro-code ROM 212 and latch 214. Further, micro-code ROM 212 is dual-ported, that is, a pair of output ports are provided both of which are connected to an input of multiplexer 217. The pair of ports are denoted port A and port B. A branch condition signal line 219 provides a signal for steering multiplexer 217 to appropriately select one of the two vectors provided along port A or port B. A branch target address line, corresponding to line 28 of FIG. 1, is not required. These differences between the micro-code sequencer of FIG. 5 and the conventional sequencer of FIG. 1 will be described in greater detail below with reference to a timing sequence diagram provided in FIG. 6. Remaining elements of the micro-code sequencer of FIG. 5 operate in the same manner as corresponding components of the conventional implementation of FIG. 1 and will not be described in further detail here. For clarity, the components of the micro-code sequencer of FIG. 5 are illustrated by the same reference numerals as corresponding components of FIG. 1, but incremented by 200.

Figure 2:
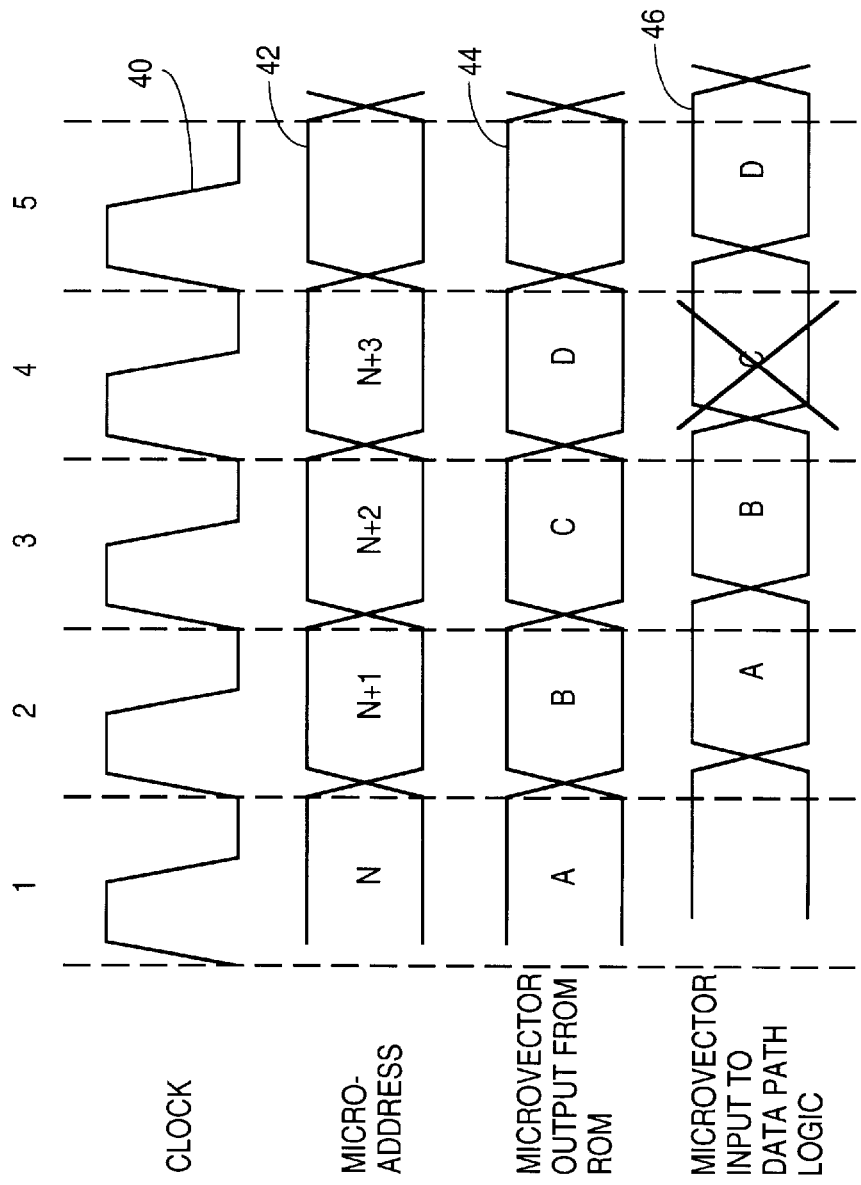
FIG. 2 is a timing diagram illustrating the pipe-lining of micro-code fetches and micro-code executions within the micro-code sequencer of FIG. 1.
Figure 6:
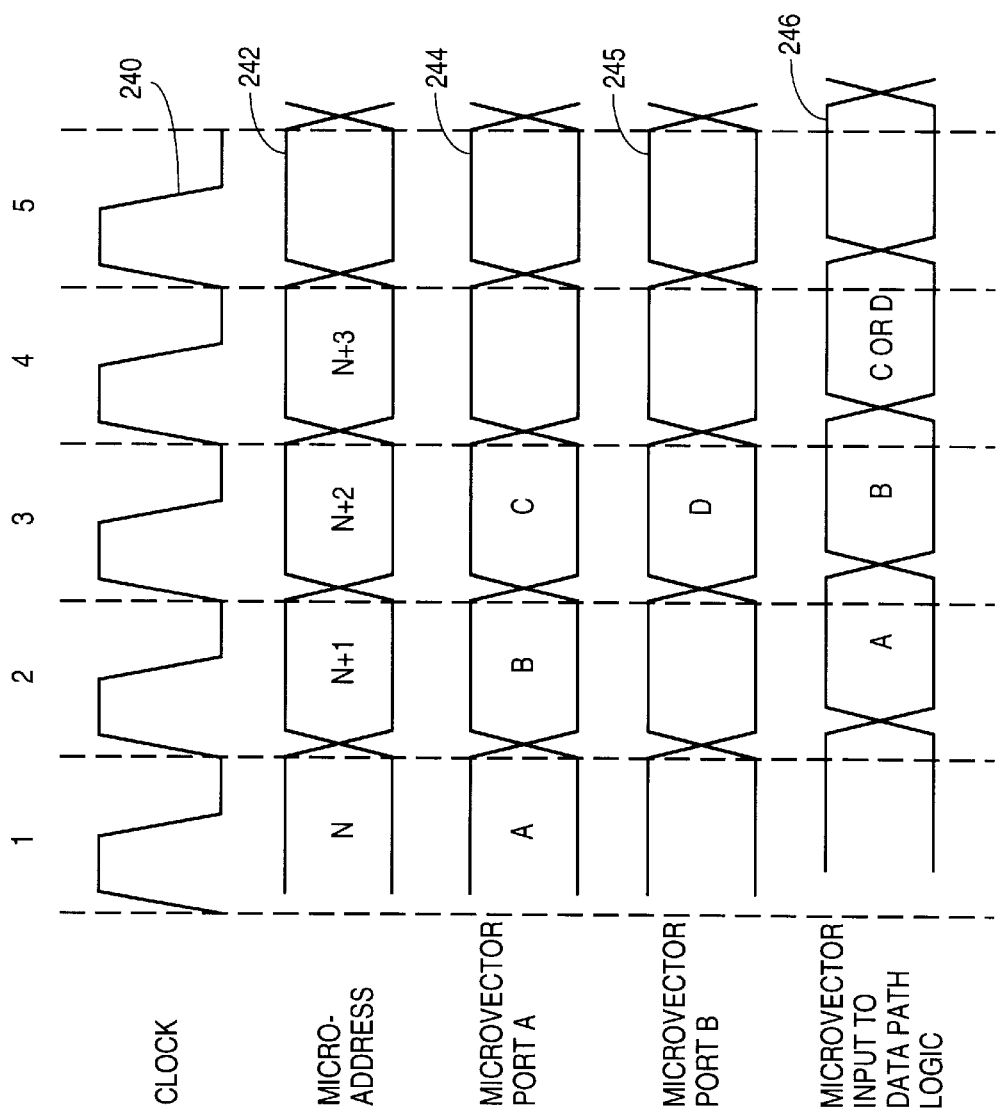
FIG. 6 is an exemplary timing diagram illustrating the pipe-lining of vector fetches and vector executions for the micro-code sequencer of FIG. 5, wherein a branch-taken vector stream and a branch-not-taken stream both have a length of one vector.

Referring to FIG. 6, the operation of the micro-code sequencer of FIG. 5 will now be described. FIG. 6 illustrates timing diagrams for sequencer 210 including a clock signal 240, a micro-address sequence 242, and a single data path logic sequence 246. However, unlike the timing sequence of FIG. 2 which includes a single sequence for vector latch-inputs 45, FIG. 6 illustrates a pair of vector sequences 244 and 245.

Sequence 244 illustrates a sequence of vectors output from micro-code ROM 212 along port A. Micro-vector sequence 245 illustrates a sequence of vectors output from micro-code ROM 212 along port B. As can be seen, these vector sequences are output in parallel.

As discussed above in the Description of Related Art, a problem occurs within a conventional pipelined micro-code sequencer when a branch condition occurs. By the time the data path logic unit determines which branch is to be taken, the branch-not-taken vector has already been fetched and latched. Thus, if the branch condition requires that the branch-taken vector be executed, then the branch-not-taken vector stored in the latch must be squashed and a clock cycle wasted before the correct branch-taken vector is fetched and latched. The implementation of the micro-code sequencer of the invention solves this problem by having the micro-code ROM simultaneously output both the branch-taken and the branch-not-taken vectors to multiplexer 217. Once it has been determined whether the branch is to be taken, a branch condition signal is transmitted along line 219 to multiplexer 217 causing the multiplexer to select either the vector provided along port A or the vector provided from port B. Hence, latch 214 receives the correct vector to be executed regardless of whether the branch is taken or not taken, without wasting the clock cycle.

In FIG. 6, the micro-addresses are represented by N, N+1, N+2, and N+3. Port A of micro-code ROM 212 output vectors A, B, and C, corresponding to micro-addresses N, N+1, and N+2. Vectors A, B and C are provided sequentially at clock cycles 1, 2 and 3, respectively. Micro-vector B represents a branch condition. Following the evaluation of the branch condition, either vector C or vector D is to be executed. In this implementation, vector C and vector D are both given the same vector address N+2. Thus, when micro-code ROM 212 receives micro-address N+2 along input line 232, ROM 212 fetches both vector C and vector D providing vector C along port A and vector D along port B. In FIG. 6, timing sequence 245 illustrates that vector D is provided in parallel with vector C at clock cycle 3.

The execution of the vectors is illustrated by timing sequence 246 in FIG. 6. As can be seen, vector A is executed a clock cycle 2, and vector B is executed at clock cycle 3. Each vector is executed by the data path logic unit one clock cycle after the vector is fetched from micro-code ROM 212. At clock cycle 3, vector B is evaluated to determine whether execution should branch to vector C or vector D. At clock cycle 4, the appropriate vector C or D is retrieved from latch 214 and executed by data path logic unit 216. If the evaluation of vector B indicates that vector C is to be executed immediately following the branch condition, then vector C is output from multiplexer 217, latched by latch 214, and executed by data path logic 216. If the evaluation of vector B indicates that vector D is to be executed, then vector D is output from multiplexer 217, latched and executed. Hence, regardless whether of the branch is taken or not taken, execution of the next vector proceeds immediately at the following clock cycle. Evaluation of the branch condition occurs at clock cycle 3, and execution of the subsequent branched vector occurs at clock cycle 4, without wasting a clock cycle. This is to be contrasted with the conventional implementation of FIG. 1 wherein evaluation of the branch condition is not determined until after vector C is already latched, possibly requiring the squashing of a fetched vector and the wasting of a clock cycle.

Multiplexer 217 is configured to automatically transmit vectors from port A unless a contrary control signal is received along line 219 indicating that a vector from port B is to be transmitted. For a micro-code implementation where the branch-not-taken vector always has a length of one micro-vector, multiplexer 217 is configured to automatically revert to port A after transmitting a single vector from port B. Regardless of whether the branch-not-taken vector stream has a length of one, a branch target address need not be transmitted to micro-instruction MUX 224. In other words, a transmission path corresponding to line 28 of FIG. 1 is not required. Both the branch-taken vector and branch-not-taken vector share a micro-address immediately succeeding the micro-address of the branch condition vector. Hence, it is sufficient for adder 222 to merely increment micro-instruction pointer 220 at each clock cycle. In the conventional implementation the branch target address must be transmitted to the micro-instruction MUX such that the micro-instruction pointer is provided with the correct starting address for a branch-taken vector. In the embodiment of FIG. 5, the branch target address is not required. In the conventional implementation, the branch target address is stored directly in the branch condition vector. The branch target address is extracted from the branch condition vector and transmitted to the micro-instruction MUX. In the implementation of FIG. 5, a branch target address need not be stored within the branch condition vector, since the branch target address is always the micro-address immediately succeeding the branch condition vector address.

For the example shown in FIG. 6, the evaluation of the branch condition proceeds in accordance with the techniques of conventional micro-code sequencers and will not be described in further detail herein. Further, the processing of branch conditions by the micro-instruction pointer, micro-instruction multiplexer, and the adder, is in accordance with conventional techniques. Rather, the only modifications to a conventional micro-sequencer implementation that are required for the embodiment of FIG. 6 are the provisions of multiplexer 217, branch condition line 219, parallel output ports A and B, the elimination of a branch target address to micro-instruction multiplexer 224 and the modification of the micro-code ROM to ensure that branch-taken and branch-not-taken vectors have identical micro-addresses. With regard to the latter requirement, the actual modification of micro-code to provide branch-taken and branch-not-taken vectors with identical micro-addresses is straight-forward and will not be described in further detail herein.

The principles of the invention can be advantageously employed in any computer system incorporating pipelined micro-code. For example, the invention may be implemented in the Pentium microprocessor provided by Intel Corporation of Santa Clara, Calif. Pentium is a trademark of Intel.

In the example of FIG. 6, the micro-vector sequence terminates after execution of either the C or D vectors, i.e. the branch sequences each have a length of one micro-vector. In an alternative embodiment, illustrated in FIGS. 7 and 8, micro-code sequences are employed which do not necessarily terminate after the execution of the first branch-taken vector or the first branch-not-taken vector. In such cases, the branch length can be greater than one and a means for steering multiplexer 217 is required. This means will now be described with reference to FIGS. 7 and 8.

Figure 7:
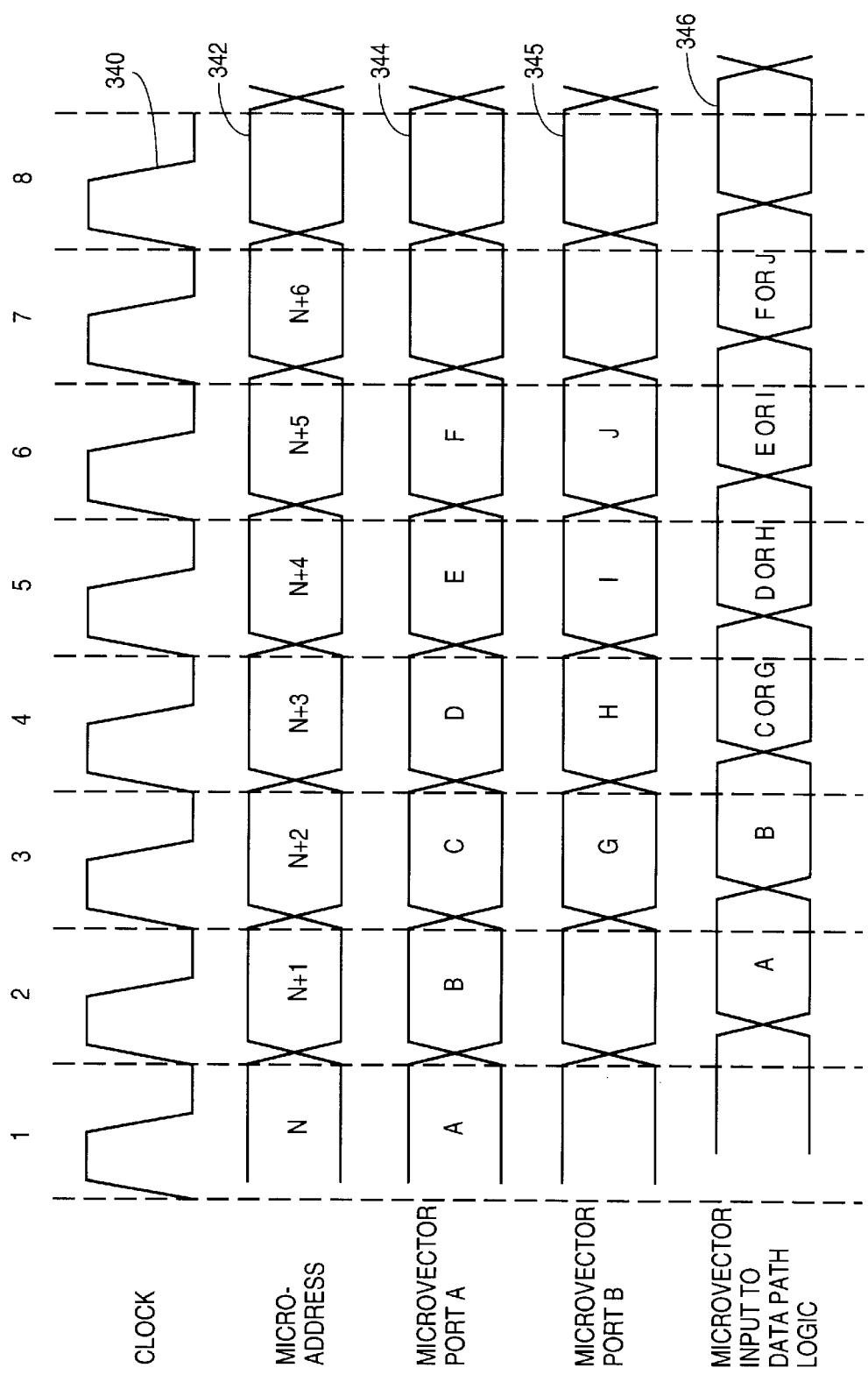
FIG. 7 illustrates an alternative timing diagram for a micro-code sequencer wherein a branch-taken vector stream and a branch-not-taken vector stream each have a length greater than one.

FIG. 7 illustrates timing sequences for an example wherein the length of a branch is four. In particular, FIG. 7 includes a clock sequence 250, a micro-address sequence 252, a port A vector sequence 254, a port B vector sequence 255, and a data path logic execution sequence 256. The timing sequences of FIG. 7 generally correspond to those of FIG. 6 and will not be described in detail. Branch condition B branches to a vector G. Thus, if the branch is not taken vectors C, D, E, and F are executed as the branch-not-taken vector sequence. However, if the branch is taken, then vectors G, H, I, and J are executed as the branch-taken vector sequence. Ultimately, execution terminates either after the execution of vector F or the execution of vector J. A mechanism for steering multiplexer 217 is required to ensure that all vectors of branch G, H, I and J are executed if the branch is taken.

In a micro-code ROM implementation where branch-taken streams and branch-not-taken streams have a length of one, multiplexer 217 is configured to automatically revert to port A after transmitting a single vector through port B. The automatic reversion to port A after the execution of a single vector from port B is sufficient since the branch-taken stream provided through port B will never have more than one vector. For a micro-code implementation where the length of the branch-taken stream may be greater than one, automatic reversion to port A after executing a single vector is not proper and will prevent execution of all micro-vectors within the branch-taken stream. To properly steer multiplexer 217 when the micro-code includes branches having a length greater than one, one of the bits of the last vector within each stream is provided with a one. All other vectors are provided with a zero in that bit. Preferably, the least significant bit is employed for this purpose. In the following, it is assumed that the least significant bit is used, although another bit location could be employed. Multiplexer 217 is configured with a circuit for accessing the least significant bit to determine whether the received vector is the last vector in the stream. Once a control signal is received along line 219 indicating that a branch-taken vector is to be received through port B, multiplexer 217 will continue to receive vectors through port B until accessing a vector having a one in the least significant bit. Then multiplexer 217 resumes accessing vectors from port A. A flip-flop (not shown) maintains an indication of the port being used. The flip-flop maintains a zero for all vectors to be drawn from port A and maintains a one for vectors to be drawn from port B. Toggling of the flip-flop may be controlled through an examination of the branch conditions. Other methods may be employed for properly steering multiplexer 217. For example, the least significant bit of each vector of the branch-taken stream, other than the last vector, may be set to one. In such an implementation, a flip-flop is not required for steering the multiplexer. Rather, the multiplexer merely examines the least significant bit of each vector to determine the port. Each least significant bit of each vector in the branch-not-taken stream is set to zero. However, utilizing the least significant bit of the last vector in combination with a flip-flop is preferred since it has minimal impact on the implementation on the micro-code and the micro-code sequencer. Indeed, some conventional micro-code implementations already utilize the least significant bit of each micro-vector to designate the end of a micro-instruction sequence. In such an implementation, minimal additional modifications are required to implement the steering mechanism described above. In a micro-code implementation wherein the least significant bit of each micro-vector is used for another purpose, an alternative steering mechanism may be required, such as a vector by vector steering mechanism. One such alternative steering mechanism utilizes a flip-flop (not shown) connected to multiplexer 217.

Figure 8:
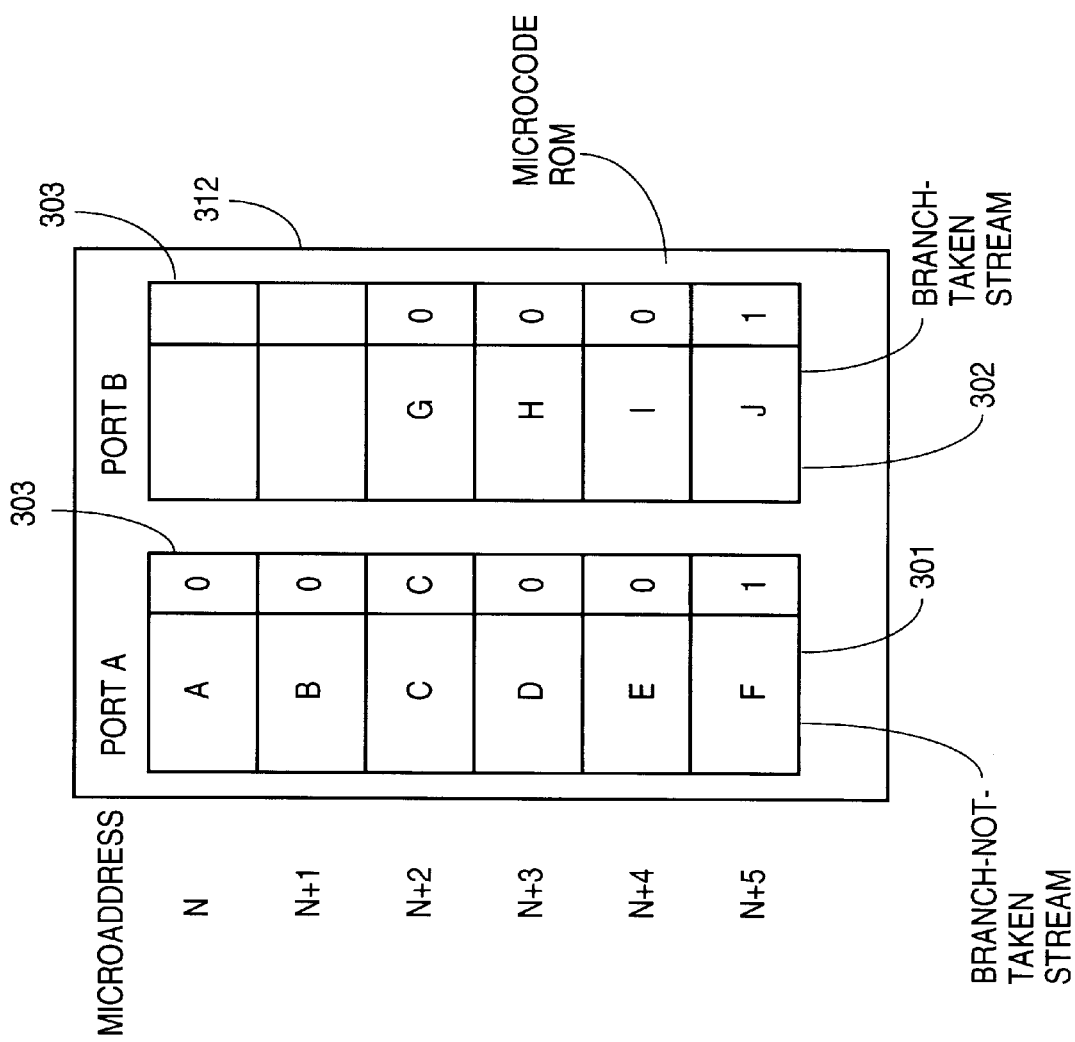
FIG. 8 illustrates a micro-code ROM having micro-code vectors sharing common address for processing with the timing sequence illustrated in FIG. 7, and wherein a least significant bit of each vector is used for steering the latch-input multiplexer illustrated in FIG. 5.

FIG. 8 provides an illustration of micro-code ROM restructured in accordance with the invention. The example illustrated in FIG. 8 corresponds to the micro-code timing sequences illustrated in FIG. 7. In FIG. 8, the micro-code ROM is designated by reference numeral 312. As can be seen, ROM 312 includes a branch-not-taken stream 301 and a branch-taken stream 302. Branch-not-taken stream includes vectors A, B, C, D and F corresponding to micro-addresses N through N+5. Branch-not-taken stream includes vectors G, H, I and J corresponding to micro-addresses N+2 through N+5. In accordance with the descriptions provided above, the branch-taken stream vectors share common addresses with the branch-not-taken vectors. FIG. 8 also illustrates the least significant bit 303 of the vectors. The least significant bit of each vector is set to zero with the exception that the last vector in each stream has a least significant bit set to one. In other words, vectors F and J each have a least significant bit set to one. In this manner, the end of the instruction may be determined by examining the least significant bit.

Additionally, the least significant bit provides a steering mechanism for steering multiplexer 217. If multiplexer 217 is switched to selecting vectors through port B (vectors G, H, I and J) as a result of the evaluation of branch condition B, the one in the least significant bit of last vector J provides an indication that a next vector should be drawn from port A. Since vector J is the last vector in the branch taken stream of the instruction, the next vector to be executed will the be the first vector of a different instruction sequence. By utilizing the least significant bit in this manner, multiplexer 217 merely continues to access vectors from port B after an evaluation that a branch is to be taken until an examination by the multiplexer of the least significant bit of a vector yields a one, causing a multiplexer to revert to accessing vectors through port A. For the implementation of the invention described herein, it is not necessary that the least significant bit of vector F be provided with a one. A one is illustrated in FIG. 8 to show consistency with certain conventional micro-code implementations which utilize the least significant bit of each vector for designating the end of an instruction.

What has been described is a micro-code sequencer which allows for pipelined fetching and execution of micro-code vectors without wasting clock cycles when branches are taken. It should be noted that the pipe-lining described herein is similar to, but independent of, pipe-lining which may occur in the micro-processor chip as a whole which may involve multi-stage pipe-lining of instruction fetches, decodes, arithmetic logic unit execution, memory access, and write-back stages. The higher order pipe-lining of the overall micro-processor chip is substantially independent of the pipe-lining within the micro-code sequencer. However, an action requiring flushing of the overall pipeline may require flushing of micro-code vectors within the micro-code sequencer if the execution of the corresponding structure is squashed as part of the overall pipeline flush.

In the block diagrams of the drawings, most component interconnections are represented by single arrows. Arrows which cross or interconnect with a dot indicate a physical interconnection. Lines which merely cross without a dot indicate no physical interconnection. Many of the interconnection lines are actually implemented as BUS lines.

The foregoing has described embodiments of an improved micro-code sequencer. It is contemplated that changes and modifications may be made, by those of ordinary skill in the applicable art, to the components and elements of the present invention without departing from the spirit and scope of the invention.

I claim:

1. A device for processing micro-code, comprising:
   micro-code means for providing sequences of micro-code vectors, said sequences of micro-code vectors including branch condition micro code vectors, branch-taken micro-code vectors and corresponding branch-not-taken micro-code vectors, with each branch-taken micro-code vector and corresponding branch-not-taken micro-code vector sharing a common micro-address;
   output means for outputting micro-code vectors from said micro-code means, with a branch-taken micro-code vector and a corresponding branch-not-taken micro-code vector being output substantially in parallel;
   micro-code vector selection means, connected to said output means, for selecting between said branch-taken micro-code vector and said corresponding branch-not-taken micro-code vector;
   micro-code vector address selection means connected to said micro-code means for selecting micro-code vectors to be output from said output means without retrieving stored addresses in said branch condition micro-vectors, said micro-code vector address selection means comprising a pointer for identifying said micro-vectors to be output and a plus one adder for incrementing address stored in said pointer on each clock cycle such that micro-code vector address selection means selects next sequentially stored micro-code vectors in said micro-code means after selecting branch condition micro-vectors; and data path logic unit coupled to said output means for executing said micro-code vectors, wherein said data path logic unit executes said branch condition vectors a clock cycle after which said branch condition micro-code vectors are retrieved from said micro-code means.

2. The device for processing micro-code of claim 1, wherein said micro-code means comprises a micro-code ROM.

3. The device for processing micro-code of claim 2, wherein said output means comprises first and second output ports, respectively, of said micro-code ROM.

4. The device for processing micro-code of claim 1, wherein said micro-vector selection means comprises a multiplexer.

5. The device for processing micro-code of claim 1, further including micro-code execution means for receiving and executing micro-code vectors selected by said selection means.

6. The device for processing micro-code of claim 5, wherein said micro-code execution means comprises:

a latch connected to said micro-code vector selection means, said latch storing said micro-code vectors selected by said selection means; and a data path logic unit, connected to said latch, said data path logic unit accessing and processing micro-code vectors stored in said latch.

7. A computer system, comprising:

a microprocessor means for processing instructions, a memory means for storing data, input/output means for inputting and outputting data from said microprocessor, and a bus means for interconnecting said microprocessor, said memory and said input/output devices; with said microprocessor means having an instruction decoder means for decoding instructions, a micro-code means for providing sequences of micro-code vectors, said sequences of micro-code vectors including branch condition micro-code vectors, branch-taken micro-code vectors and branch-not-taken micro-code vectors, a micro-code execution means for executing said micro-code vectors, and a micro-code sequencer means for retrieving micro-code vectors from said micro-code means and for providing said micro-code vectors to said data path logic units; wherein said micro-code sequencer means includes first and second output means for outputting micro-code vectors from said micro-code means, said branch-not-taken micro-code vectors being output from said first output means and said branch-taken micro-code vectors being output from said second output means, said branch-taken and branch-not-taken micro-code vectors sharing a common micro-address and being output in parallel;

micro-code vector selection means, connected to said micro-code vector output means, for selecting one of said branch-taken micro-code vectors and said branch-not-taken micro-code vectors; and micro-code vector address selection means connected to said micro-code means for selecting micro-code vectors to be output from said output means without retrieving stored addresses in said branch condition micro-vectors, said micro-code vector address selection means comprising a pointer for identifying said micro-vectors to be output and a plus one adder for incrementing addresses stored in said pointer on each clock cycle such that micro-code vector address selection means selects next sequentially stored micro-code vectors in said micro-code means after selecting branch condition micro-vectors.

8. The device for processing micro-code of claim 1, wherein said branch-taken micro-code vectors comprise a first stream of micro-code vectors for sequential execution if the branch is taken, and said branch-not-taken micro-code vectors comprise a second stream of micro-code vectors for sequential execution if said branch is not taken.

9. The device for processing micro-code of claim 8, wherein an initial micro-code vector of said first stream shares a common micro-address with an initial micro-code vector in said second stream and wherein each succeeding micro-code vector in said first stream shares a common micro-address with a succeeding corresponding micro-code vector in said second stream.

10. The device for processing micro-code of claim 8, wherein said first and second streams each include only a single micro-code vector.

11. The device for processing micro-code of claim 8, wherein said selection means examines a least significant bit of each selected micro-code vector to identify the last micro-code vector in the micro-code stream.

12. A device for processing micro-code, comprising:

micro-code ROM for providing sequences of micro-code vectors, said sequences of micro-code vectors including branch condition micro code vectors, branch-taken micro-code vectors and corresponding branch-not-taken micro-code vectors, with each branch-taken micro-code vector and corresponding branch-not-taken micro-code vector sharing a common micro-address;

first and second output ports, connected to said micro-code ROM, for outputting micro-code vectors from said micro-code ROM, said branch-not-taken micro-code vectors being output from said first output port and said branch-taken micro-code vectors being output from said second output port, said branch-taken and branch-not-taken micro-code vectors being output substantially in parallel;

a multiplexer, connected to said micro-code vector output ports for selecting between a branch-taken micro-code vector and a corresponding branch-not-taken micro-code vector; and micro-code vector address selector connected to said micro-code ROM for selecting micro-code vectors to be output from said first and second output ports without retrieving stored addresses in said branch condition micro-vectors, said micro-code vector address selector comprising a pointer for identifying said micro-vectors to be output and a plus one adder for incrementing addresses stored in said pointer on each clock cycle such that micro-code vector address selector selects next sequentially stored micro-code vectors in said micro-code ROM after selecting branch condition micro-vectors.

13. The device for processing micro-code vectors of claim 12, further including a latch connected to said multiplexer for storing said selected micro-code vector; and a data path logic unit, connected to said latch, for accessing and processing micro-code vectors stored in said latch.

14. A computer system, comprising:

a microprocessor, a memory, input/output devices, and a bus interconnecting said microprocessor, said memory and said input/output devices; with said microprocessor having an instruction decoder, a micro-code ROM, said micro-code ROM providing sequences of micro-code vectors, said sequences of micro-code vectors including branch condition micro-code vectors, branch-taken micro-code vectors and branch-not-taken micro-code vectors, a data path logic unit, and a micro-code sequencer for retrieving micro-code vectors from said micro-code ROM and for providing said micro-code vectors to said data path logic unit; wherein said micro-code sequencer includes first and second output ports, connected to said micro-code ROM, said first and second output ports outputting micro-code vectors from said micro-code ROM, said branch-not-taken micro-code vectors being output from said first output port and said branch-taken micro-code vectors being output from said second output port, said branch-taken and branch-not-taken micro-code vectors sharing a common address and being output in parallel;

a multiplexer, connected to said micro-code vector output ports, said multiplexer selecting one of said branch-taken micro-code vectors and said branch-not-taken micro-code vectors; and micro-code vector address selector connected to said micro-code ROM for selecting micro-code vectors to be output from said first and second output ports without retrieving stored addresses in said branch condition micro-vectors, said micro-code vector address selector comprising a pointer for identifying said micro-vectors to be output and a plus one adder for incrementing addresses stored in said pointer on each clock cycle such that micro-code vector address selector selects next sequentially stored micro-code vectors in said micro-code ROM after selecting branch condition micro-vectors.

15. The device for processing micro-code of claim 12, wherein said branch-taken micro-code vectors comprise a first stream of micro-code vectors for sequential execution if the branch is taken, and said branch-not-taken micro-code vectors comprise a second stream of micro-code vectors for sequential execution if said branch is not taken.

16. The device for processing micro-code of claim 15, wherein an initial micro-code vector of said first stream shares a common micro-address with an initial micro-code vector in said second stream and wherein each succeeding micro-code vector in said first stream shares a common micro-address with a succeeding corresponding micro-code vector in said second stream.

17. The device for processing micro-code of claim 15, wherein said first and second streams each include only a single micro-code vector.

18. The device for processing micro-code of claim 8, wherein said multiplexer examines a least significant bit of each selected micro-code vector to identify the last micro-code vector in the micro-code stream.

19. In a device for processing micro-code having a micro-code ROM generating micro-code vectors, including branch condition micro-vectors, branch-taken micro-code vectors and branch-not-taken micro-code vectors, a latch for receiving said micro-code vectors, and data path logic for retrieving said micro-code vectors from said latch and performing operations in response thereto, an improvement comprising:

providing said micro-code ROM with first and second output ports, said micro-code ROM simultaneously outputting a branch-taken micro-code vector and a branch-not-taken micro-code vector through said first and second output ports, respectively, with said branch-taken micro-code vector and said branch-not-taken micro-code vector sharing a common micro-address;

providing a multiplexer, connected between said micro-code ROM and said latch, for selecting between a micro-code vector received from either said first output port or said second output port; and providing a micro-code vector address selector connected to said micro-code ROM for selecting micro-code vectors to be output from said first and second output ports without retrieving stored addresses in said branch condition micro-vectors, said micro-code vector address selector comprising a pointer for identifying said micro-vectors to be output and a plus one adder for incrementing addresses stored in said pointer on each clock cycle such that micro-code vector address selector selects next sequentially stored micro-code vectors in said micro-code ROM after selecting branch condition micro-vectors.

20. A method for processing micro code, comprising:

storing sequences of micro-code vectors in a memory device, said sequences of micro-code vectors including branch condition micro-code vectors, branch-taken micro-code vectors and branch-not-taken micro-code vectors with said branch-taken micro-code vectors sharing a common micro-address with corresponding branch-not-taken micro-code vectors;

evaluating said branch condition micro-code vectors to determine which of said branch-taken and branch-not-taken micro-code vectors is to be executed;

selecting a branch target address containing both branch-taken micro-code vectors and branch-not-taken micro-code vectors in said memory device without retrieving stored addresses in said branch condition micro-code vectors wherein said selecting is performed by retrieving said vectors stored in address locations immediately succeeding said branch condition micro-code vectors;

outputting said branch-taken micro-code vectors and said branch-not-taken micro-code vectors in parallel from said memory device; and selecting one of said branch-taken micro-code vectors and said branch-not-taken micro-code vectors, in response to said evaluation.

21. A device for processing micro-code, comprising:

micro-code ROM for providing micro-code vectors, said micro-code vectors including branch condition micro-code vectors identifying branch-taken micro-code vectors and branch-not-taken micro-code vectors, said branch-taken micro-code vectors and said branch-not-taken micro-code vectors sharing a common micro-address said branch-taken micro-code vectors being output through a first output port, said branch-not-taken micro-code vectors being output through a second output port;

a latch, connected to said first and second output ports, for storing one of said micro-code vectors, said latch storing said branch-taken micro-code vector if said branch is taken and storing said branch-not-taken micro-code vector otherwise;

a data path logic unit, connected to said latch, for retrieving and processing micro-code vectors from said latch;

a micro-instruction pointer for holding a current micro-code address and for transmitting said current micro-code address to said micro-code ROM;

an adder, connected to said micro-instruction pointer, for incrementing the current micro-code address; and a branch condition multiplexer for receiving branch conditions from said data path logic unit and branch target addresses from said latch and for receiving an incremented current micro-code address from said adder, said branch condition multiplexer transmitting a new micro-code address to said micro-instruction pointer, said new micro-code address replacing said current micro-code address in said micro-instruction pointer, said multiplexer transmitting either an incremented address or a branched address in response to said branch conditions.

22. A device for processing micro-code, comprising:

micro-code means for providing sequences of micro-code vectors, said sequences of micro-code vectors including branch condition micro-code vectors triggering one of a plurality of alternative streams of micro-code vectors, with each micro-code vector of one of said alternative streams of micro-code vectors sharing a common micro-address with a corresponding micro-code vector of another of said alternative streams;

a plurality of output means for outputting micro-code vectors from said micro-code means, with one of said alternative streams of micro-code vectors being output along each of said plurality of output means, said alternative streams of micro-code vectors being output in parallel;

micro-code vector selection means, connected to said output means, for selecting one of said streams of micro-code vectors; and micro-code vector address selection means connected to said micro-code means for selecting micro-code vectors to be output from said output means without retrieving stored addresses in said branch condition micro-vectors, said micro-code vector address selection means comprising a pointer for identifying said micro-vectors to be output and a plus one adder for incrementing addresses stored in said pointer on each clock cycle such that micro-code vector address selection means selects next sequentially stored micro-code vectors in said micro-code means after selecting branch condition micro-vectors.

23. The micro-code processing device of claim 22, further including micro-code execution means for executing micro-code vectors selected by said selection means, for evaluating said branch condition micro-code vectors to determine which of said alternative streams is to be selected, and for transmitting a signal representative of said evaluation to said selection means.

\* \* \* \* \*

UNITED STATES PATENT AND TRADEMARK OFFICE
CERTIFICATE OF CORRECTION

PATENT NO. : 5,941,986
DATED : August 24, 1999
INVENTOR(S) : Kulkarni

It is certified that error appears in the above-identified patent and that said Letters Patent is hereby corrected as shown below:

Column 11,
Line 6, delete "address" and insert -- addresses --.

Signed and Sealed this

Eighteenth Day of March, 2003

JAMES E. ROGAN
*Director of the United States Patent and Trademark Office*